United States Patent [19]

Sasaki et al.

[11] Patent Number: 5,043,644
[45] Date of Patent: Aug. 27, 1991

[54] MACHINING PROGRAM CORRECTING METHOD

[75] Inventors: Takao Sasaki, Hachioji; Toshiaki Otsuki, Hino; Ryouji Eguchi, Minamitsuru, all of Japan

[73] Assignee: Fanuc Ltd., Minamitsuru, Japan

[21] Appl. No.: 536,549

[22] PCT Filed: Nov. 15, 1989

[86] PCT No.: PCT/JP89/01161

§ 371 Date: Jul. 10, 1990

§ 102(e) Date: Jul. 10, 1990

[87] PCT Pub. No.: WO90/06544

PCT Pub. Date: Jun. 14, 1990

[30] Foreign Application Priority Data

Dec. 7, 1988 [JP] Japan .................................. 63-309688

[51] Int. Cl.$^5$ ........................................... G05B 19/405
[52] U.S. Cl. ............................ 318/568.23; 318/568.1; 318/569; 318/571; 364/474.21
[58] Field of Search .................. 318/568.23, 569, 571; 364/474.21

[56] References Cited

U.S. PATENT DOCUMENTS

| | | | |
|---|---|---|---|
| 4,646,228 | 2/1987 | Ikeda | 364/474.26 |
| 4,706,002 | 11/1987 | Fukuyama | 318/569 X |
| 4,815,000 | 3/1989 | Yoneda et al. | 318/571 |
| 4,823,255 | 4/1989 | Tanaka et al. | 364/474.21 X |

Primary Examiner—William M. Shoop, Jr.
Assistant Examiner—Saul M. Bergmann
Attorney, Agent, or Firm—Staas & Halsey

[57] ABSTRACT

A method of correcting a machining program for a numerical control device during an execution of the program is provided. A created machining program, which is stored in a memory (5), is executed for a program check, a single block stop is effected at a portion (2) at which an error is found in the machining program, and the machining program is executed in reverse to a predetermined block (P1). Then the machining program is corrected and executed. Accordingly, it is not necessary to return to the beginning of the machining program for a reexecution thereof, and thus the machining program can be efficiently corrected.

5 Claims, 5 Drawing Sheets

MACHINING PROGRAM CORRECTING METHOD

DESCRIPTION

1. Technical Field

The present invention relates to a method of correcting a machining program for a numerical control device, and more particularly, to a machining program correcting method which permits an easy correction of a machining program during an execution thereof.

2. Background Art

Machining programs for a numerical control device must be checked after they are created. Particularly when the created machining program is long and complicated, a strict program check is required.

Conventionally, therefore, a machining program is displayed on the display screen of the numerical control device by graphic animation, or a CNC machine tool is operated in dry run mode without setting a workpiece, to thereby check the machining program.

According to the conventional program checking method, however, when an error is discovered the machining program must be executed again from the beginning thereof, after the error is corrected. Accordingly, even though the program part preceding the error has been checked, the entire program must be reexecuted, to thereby cause a waste of time during the program check.

SUMMARY OF THE INVENTION

The present invention was contrived in view of the above circumstances, and an object thereof is to provide a machining program correcting method which permits an easy correction of a machining program during an execution thereof.

To achieve the above object, according to the present invention, there is provided a method of correcting a machining program for a numerical control device during an execution of the machining program, comprising an execution of a created machining program for a program check, effecting a single block stop at a portion at which an error is discovered in the machining program, executing the machining program in reverse, to a predetermined block, correcting the machining program, and then executing same.

When an error is found, the program is executed in reverse to the block concerned, usually to the beginning thereof, and after correcting that block, the program is executed from the beginning of the block.

Accordingly, it is not necessary to return to the beginning of the program for a reexecution thereof.

DESCRIPTION OF THE PREFERRED EMBODIMENT

An embodiment of the present invention will be described with reference to the drawings.

Figure 1:
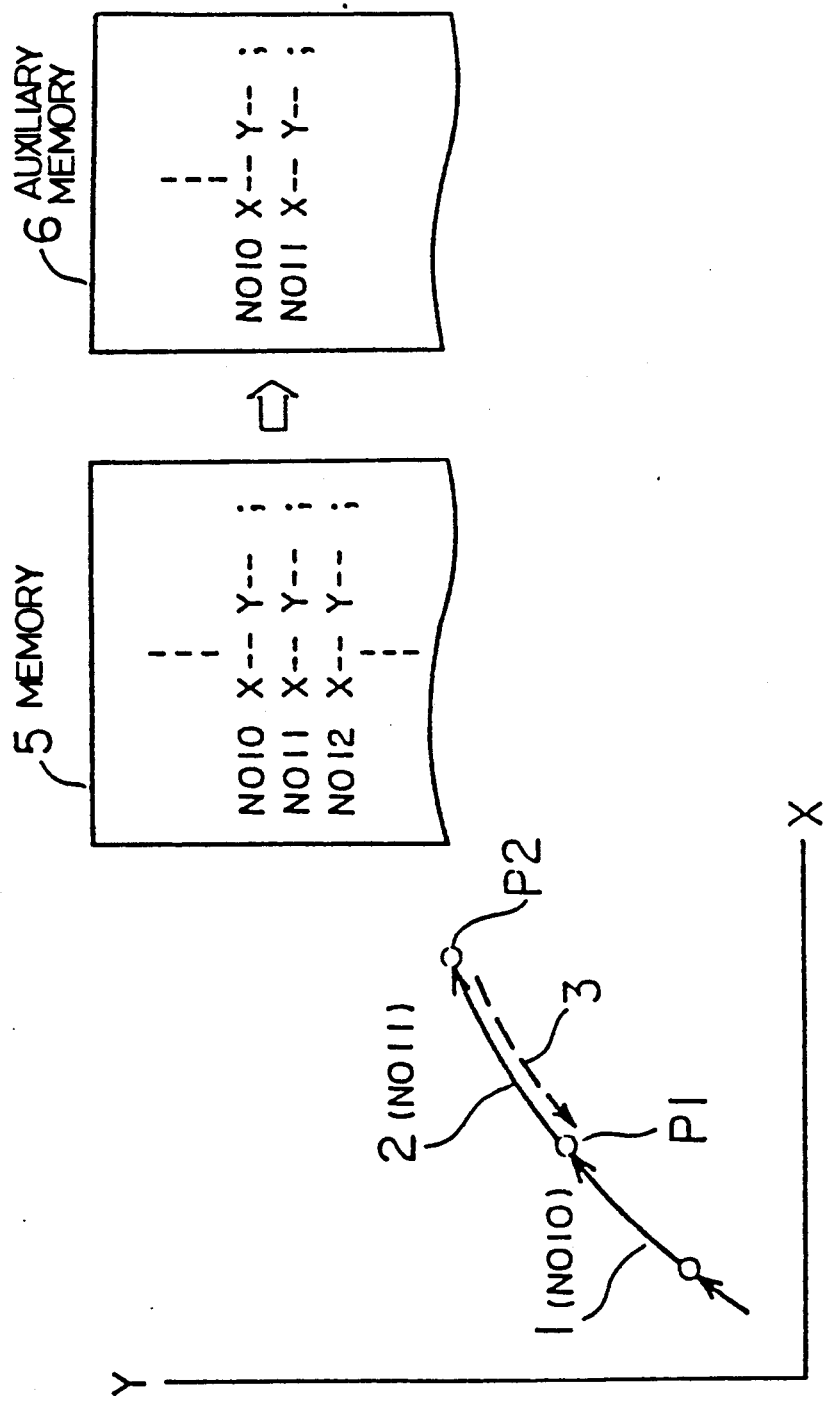
FIG. 1 is a conceptual diagram illustrating a machining program correcting method according to the present invention.

FIG. 1 is a conceptual diagram illustrating a machining program correcting method according to the present invention. Here it is assumed that a machining program is being executed in dry run mode, the pulse distribution for a path 1 having a sequence number N010 has been completed, and that an error is discovered in the machining program during the pulse distribution for a machining path 2 having a sequence number N011.

At this time, a programmer turns on a single block stop switch, whereby a numerical control device effects a single block stop at an end point P2 of the machining path 2 (N011).

The programmer then turns on a reverse switch, and when the reverse switch is turned on, the numerical control device carries out a reverse pulse distribution of the machining path 2, to thereby return to a point P1 along a path 3.

The programmer corrects the machining program at this point, and then pushes a cycle start button, whereby the numerical control device restarts the program from the point P1.

To permit the reverse execution of a program, an auxiliary memory 6 is provided in the numerical control device, in addition to a memory 5 for storing the machining program, so that movement data for which the pulse distribution has been completed is stored in the auxiliary memory 6. In FIG. 1, the program is illustrated as if it is stored in the auxiliary memory 6 in units of blocks, but in practice, since instructions corresponding to one block are subdivided for the pulse distribution, movement data is stored in the auxiliary memory 6 upon each pulse distribution. When the reverse switch is pushed, a reverse pulse distribution is carried out by using the movement data stored in the auxiliary memory 6, to thereby effect a reverse execution of the program. Although in the above description the program is checked in a dry run mode, it may be checked by drawing a workpiece and a tool on a display screen by graphic animation.

Figure 2:
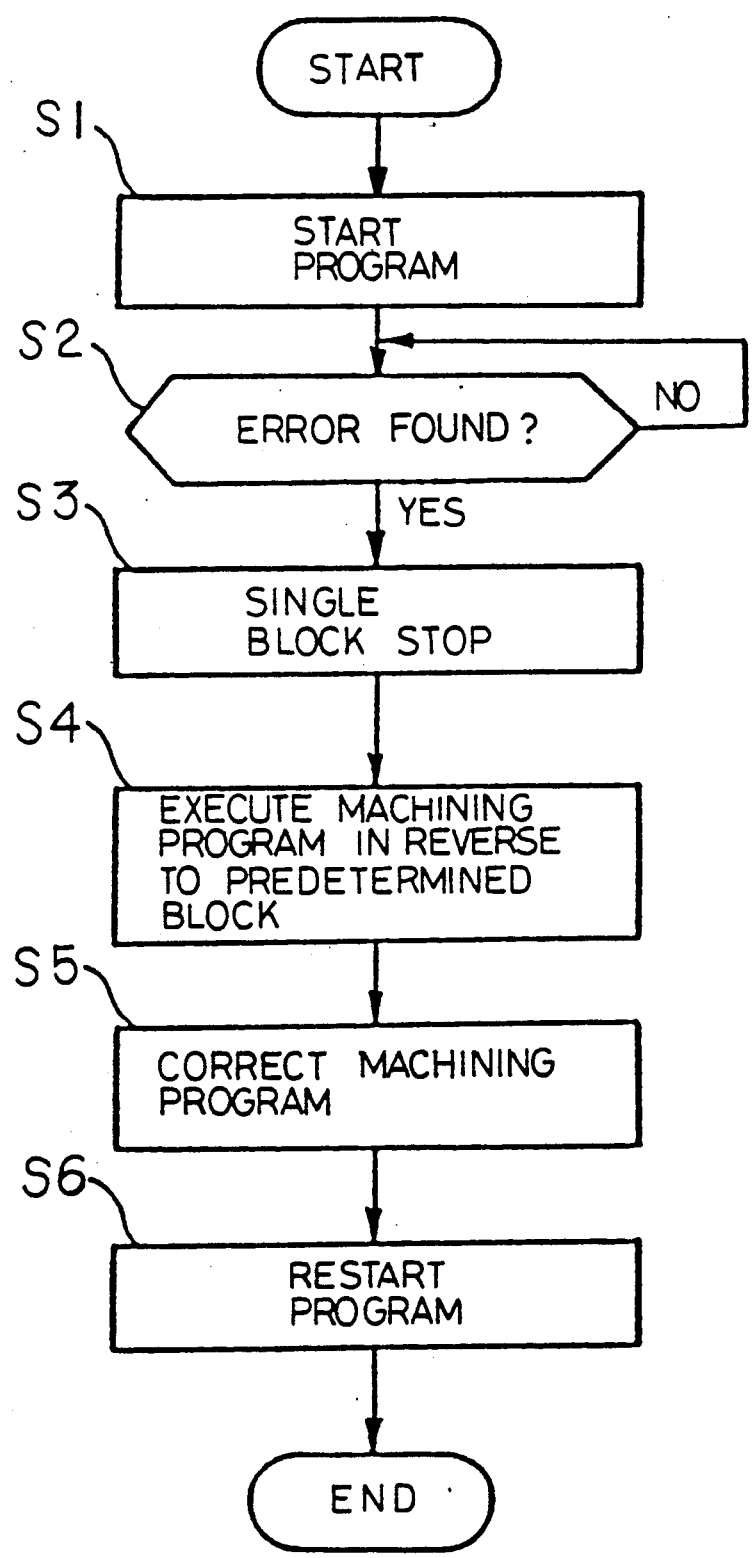
FIG. 2 is a flowchart for carrying out the machining program correcting method according to the invention.

FIG. 2 is a flowchart for carrying out the machining program correcting method according to the present invention. In the figure, the numbers following "S" represent step numbers.

[S1] A machining program is started for a program check, and movement data is stored in the auxiliary memory 6 every time the pulse distribution is effected.

[S2] The program is checked for error; if no error is discovered, execution of the program is continued. If an error is discovered, the flow proceeds to S3.

[S3] The single block switch is turned on, whereby the numerical control device effects a single block stop.

[S4] The programmer turns on the reverse switch on an operator panel, whereby the program is executed in reverse by using the movement data stored in the auxiliary memory 6.

[S6] The necessary correction is made.

[S7] The program is restarted from the block to which the program has been retraced.

Namely, the machining program is executed in reverse to a predetermined block, corrected, and restarted from that block, and accordingly, it is not necessary to return to the beginning of the machining program and restart the program from that point every time an error is corrected, whereby a correction of the machining program, and accordingly, a program check, are simplified.

Figure 3A:
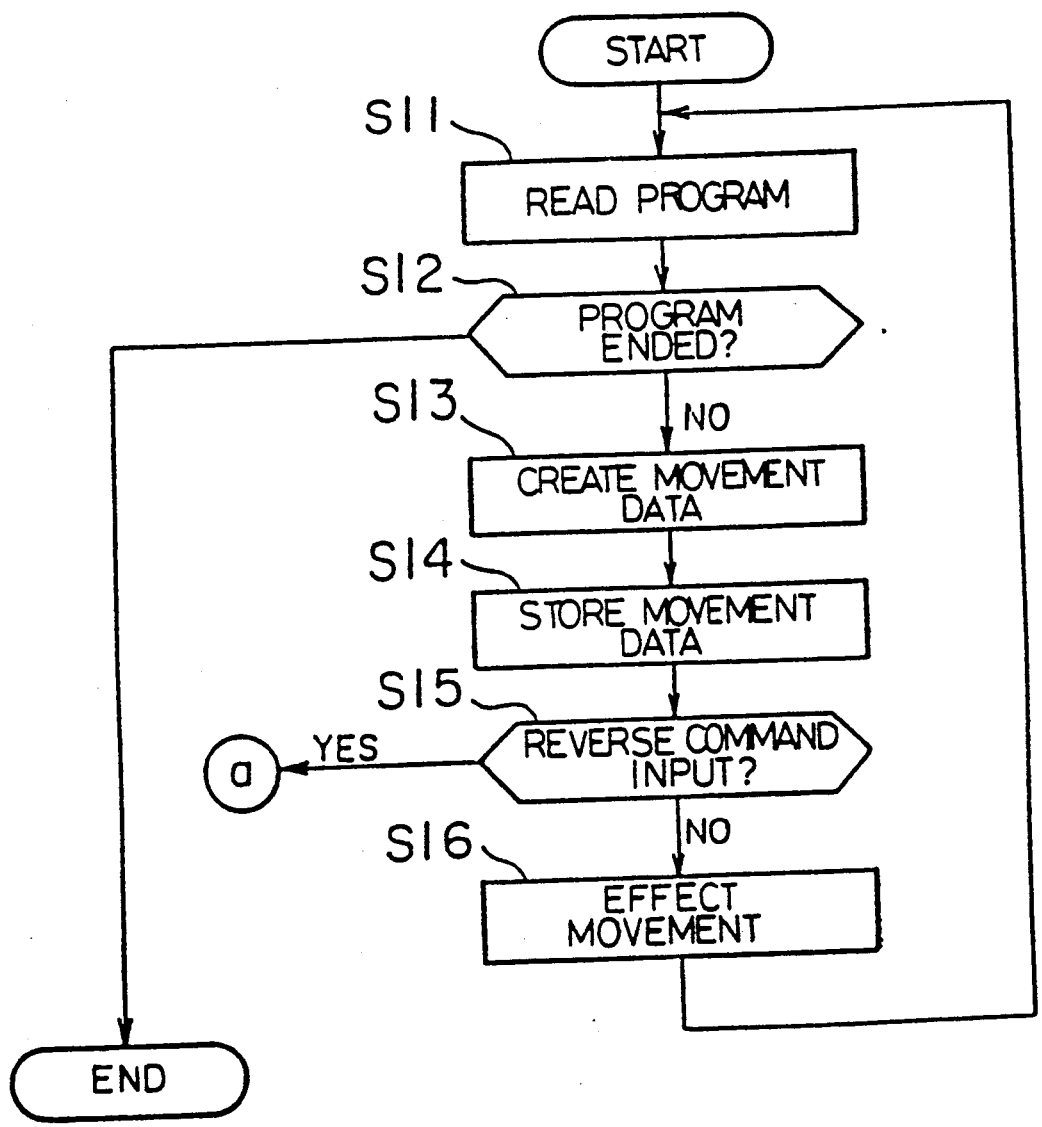
FIGS. 3(a) and 3(b) are flowcharts showing a process of a numerical control device for carrying out the machining program correcting method according to the invention.
Figure 3B:
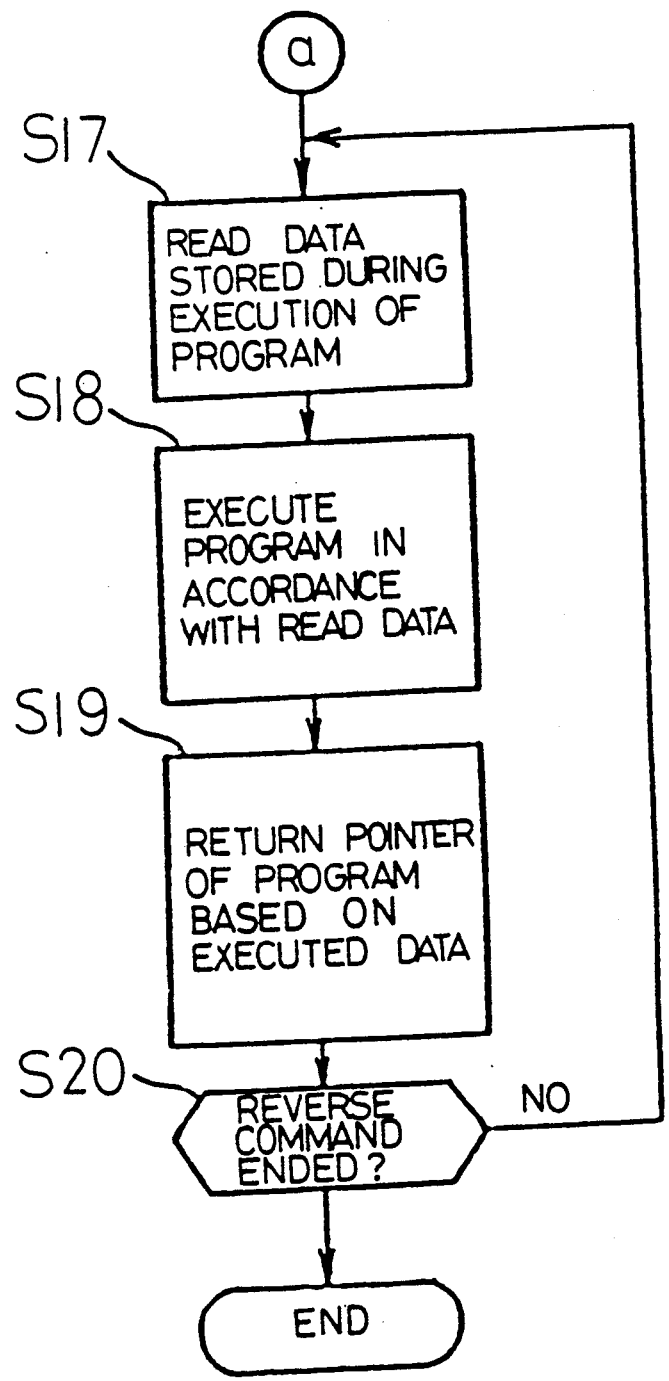

A flowchart of a process executed by the numerical control device will be now described. FIGS. 3(a) and 3(b) illustrate flowcharts for the numerical control device, according to the machining program correcting method of the invention. In the figures, the numbers following "S" represent step numbers.

[S11] One block of a machining program is read.

[S12] If the machining program is not ended, the flow proceeds to S13.

[S13] Movement data is created for pulse distribution.

[S14] The movement data is stored in the auxiliary memory 6.

[S15] If no reverse command is input, the flow proceeds to S16. If a reverse command is input, the flow proceeds to S17.

[S16] Pulse distribution is executed for movement. (Referring to FIG. 3(b))

[S17] Data stored in the auxiliary memory 6 during the execution of the program is read.

[S18] The program is executed in reverse in accordance with the read data.

[S19] The pointer of the program is returned based on the executed data.

[S20] It is determined whether or not the reverse command is ended; if it is not ended, the flow returns to S17 to continue the reverse execution of the program.

Figure 4:
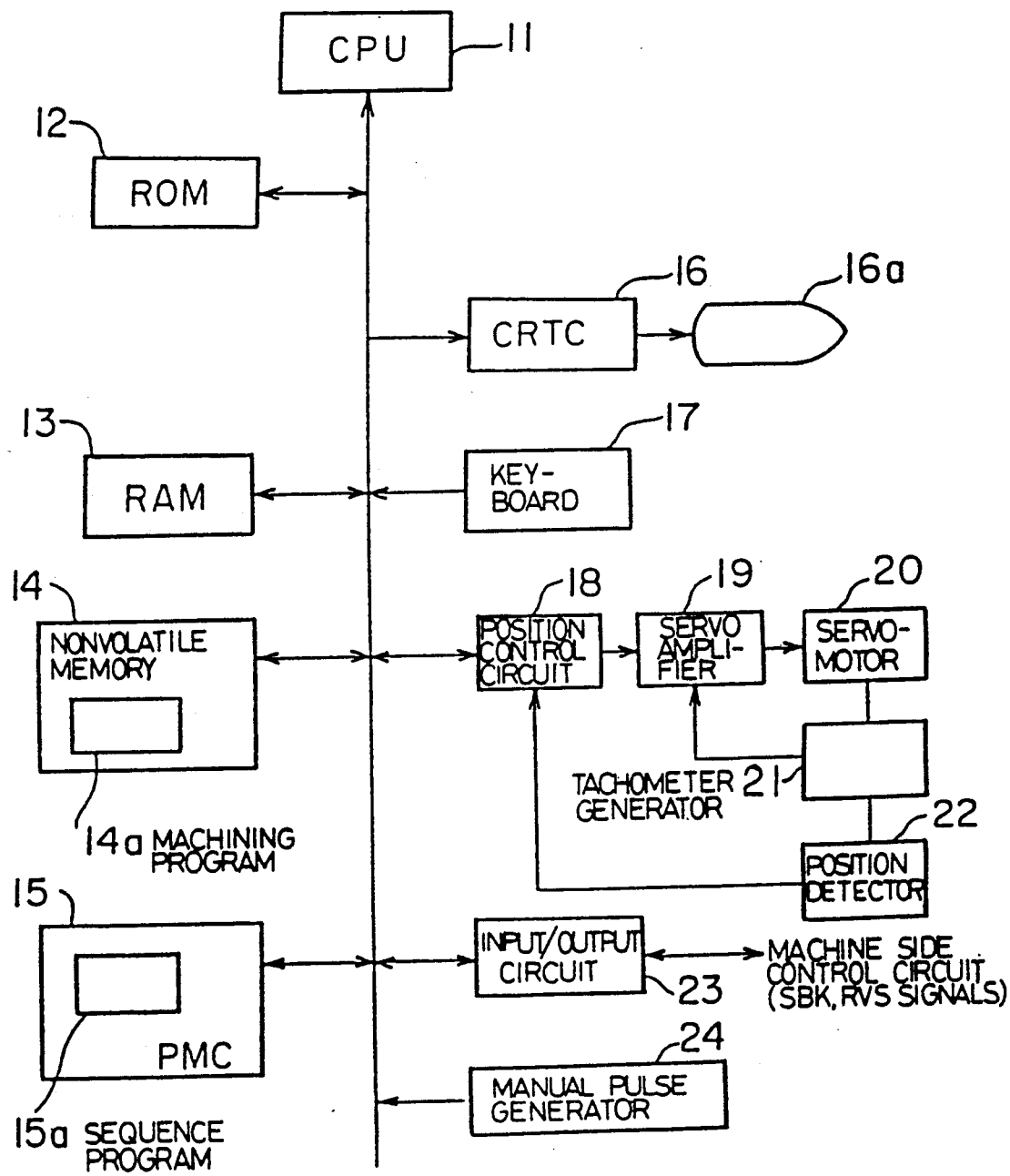
FIG. 4 is a diagram illustrating an arrangement of hardware of a numerical control device (CNC) for carrying out the present invention.

The hardware for carrying out the present invention will be now described. FIG. 4 is a schematic diagram of hardware of a numerical control device (CNC) for carrying out the present invention. In FIG. 4, numeral 11 denotes a processor for global control; 12 denotes a ROM for storing a control program; 13 denotes a RAM for storing various data; 14 denotes a nonvolatile memory for storing a machining program and parameters, etc., such as a CMOS backed up by a battery, or the like; and 14a denotes a machining program.

Numeral 15 denotes a PMC (programmable machine controller) which converts received commands, such as M-function and T-function, etc., into signals for controlling a machine tool, in accordance with a sequence program 15a, and outputs the converted signals. Numeral 16 denotes a display control circuit for converting a digital signal into a display signal; 16a denotes a display device comprising a CRT, liquid-crystal display unit, or the like; and 17 denotes a keyboard used for inputting various data.

Numeral 18 denotes a position control circuit for controlling a servomotor; 19 denotes a servo amplifier for controlling the speed of the servomotor; 20 denotes the servomotor; 21 denotes a tachometer generator for effecting a speed feedback; and 22 denotes a position detector comprising a pulse coder, optical scale, or the like. The required number of these elements corresponds to the number of axes, but only those necessary for one axis are illustrated.

Numeral 23 denotes an input/output circuit which transfers digital signals with respect to an external unit and is connected to a machine side control circuit. A signal SBK from the single block switch and a signal RVS from the reverse switch are supplied to the input/output circuit 23 from a machine side operator panel. Numeral 24 denotes a manual pulse generator mounted on the machine operator panel, for digitally moving individual axes.

The above embodiment uses only one processor, but a multi-processor system including a plurality of processors may be used instead, depending on the system configuration.

According to the present invention, as described above, when an error is found in a machining program, the program is executed in reverse to the predetermined part, the error is corrected, and the program is restarted. Accordingly, it is not necessary to return to the beginning of the machining program every time a correction is made, thus facilitating the correction of machining programs, and accordingly, the program check.

We claim:

1. A method of correcting a machining program for a numerical control device during an execution of the machining program, said method comprising the steps of:
    a) executing a created machining program for a program check;
    b) effecting a single block stop at a portion in the machining program at which an error is discovered in the machining program;
    c) executing the machining program in reverse to a predetermined block; and
    d) correcting the machining program and then executing same.

2. A method according to claim 1, wherein the reverse execution of the machining program is effected by a reverse switch provided on an operator panel.

3. A method according to claim 1, further comprising a substep of storing movement data in an auxiliary memory during the execution of the machining program for a program check, and effecting the reverse execution of the machining program in accordance with the movement data stored in the auxiliary memory.

4. A method according to claim 1, wherein the execution of the machining program for a program check is effected in a dry run mode without using a workpiece.

5. A method according to claim 1, wherein the execution of the machining program for a program check is effected by displaying a workpiece and a tool on a display screen by graphic animation.

* * * * *